(12) United States Patent
Nakamura et al.

(10) Patent No.: US 9,234,624 B2
(45) Date of Patent: Jan. 12, 2016

(54) SHAFT COUPLING GUARD AND ROTATABLE APPARATUS SYSTEM

(71) Applicant: EBARA CORPORATION, Tokyo (JP)

(72) Inventors: Yoichi Nakamura, Tokyo (JP); Junya Kawabata, Tokyo (JP); Seigo Kyo, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 30 days.

(21) Appl. No.: 14/203,747

(22) Filed: Mar. 11, 2014

(65) Prior Publication Data

US 2014/0256457 A1    Sep. 11, 2014

(30) Foreign Application Priority Data

Mar. 11, 2013    (JP) .................................. 2013-047789

(51) Int. Cl.
*F16D 3/84*    (2006.01)
*F16P 1/02*    (2006.01)

(52) U.S. Cl.
CPC .. *F16P 1/02* (2013.01); *F16D 3/843* (2013.01)

(58) Field of Classification Search
CPC .................................. F16D 3/843; F16F 1/02
USPC ............ 464/170, 176, 177; 74/609; 417/360; 248/671, 676–678
See application file for complete search history.

(56) References Cited

U.S. PATENT DOCUMENTS

| | | | | |
|---|---|---|---|---|
| 405,523 | A | * | 6/1889 | Barton .......................... 248/671 |
| 600,375 | A | * | 3/1898 | Podeyn ......................... 464/170 |
| 3,145,960 | A | * | 8/1964 | Langdon ....................... 248/671 |
| 3,891,177 | A | * | 6/1975 | Jerrel ........................ 248/676 X |
| 4,033,531 | A | * | 7/1977 | Levine ....................... 248/676 X |
| 4,324,533 | A | * | 4/1982 | Schroeder et al. ............ 417/360 |
| 4,787,583 | A | * | 11/1988 | Morton |
| 6,190,261 | B1 | | 2/2001 | Powell |
| 6,474,934 | B1 | * | 11/2002 | Jahnke et al. |
| 7,341,245 | B2 | * | 3/2008 | Joseph |
| 8,226,067 | B1 | * | 7/2012 | Jensen ......................... 248/671 |
| 2009/0264209 | A1 | | 10/2009 | Labarge, III |

FOREIGN PATENT DOCUMENTS

ES    2184617 A1    4/2003
JP    S58-92495 U    6/1983

OTHER PUBLICATIONS

European Search Report for Application No. 14020026.2 dated Jul. 7, 2014.

* cited by examiner

*Primary Examiner* — Gregory Binda
(74) *Attorney, Agent, or Firm* — Pearne & Gordon LLP

(57) ABSTRACT

A shaft coupling guard is used to cover a shaft coupling that couples a main shaft of a prime mover and a main shaft of a driven apparatus as a rotatable apparatus driven by the prime mover. The shaft coupling guard includes a guard main body formed so as to extend in a direction along an axis and having a tubular shape for circumferentially covering the shaft coupling. The guard main body includes a guard main body upper portion, and a guard main body lower portion configured to be detachable from the guard main body upper portion. The shaft coupling guard further includes a leg portion formed integrally with the guard main body and configured to support the guard main body.

12 Claims, 4 Drawing Sheets

SHAFT COUPLING GUARD AND ROTATABLE APPARATUS SYSTEM

CROSS-REFERENCE TO RELATED APPLICATIONS

This application claims priority under 35 U.S.C. 119 on Patent Application No. 2013-047789 filed in Japan on Mar. 11, 2013, the disclosure of which is hereby incorporated by reference herein in its entireties.

TECHNICAL FIELD

The present invention relates to a technique for guarding a shaft coupling.

BACKGROUND ART

There are widely known rotatable apparatus systems including a prime mover and a driven apparatus as a rotatable apparatus to be driven by the prime mover. For example, there are known pump systems including a motor as one example of the prime mover, and a pump as one example of the rotatable apparatus (the driven apparatus). In the pump systems, a main shaft of the pump is coupled to a main shaft of the motor via a shaft coupling, and the pump rotates by being driven by the motor. The shaft coupling rotates at a high speed, and therefore, generally, a shaft coupling guard is mounted around the shaft coupling to prevent a human from touching a rotating portion and a foreign object from entering therein.

Conventionally, mostly, the shaft coupling guard has been provided as a simple member that covers the shaft coupling with an arch-like (tunnel-like) structure. This arch-shaped shaft coupling guard can realize covering of the shaft coupling by an easy mounting process. However, on the other hand, this shaft coupling guard has wide arch-shaped openings at the both sides in an axial direction.

SUMMARY OF INVENTION

According to a first embodiment of the present invention, a shaft coupling guard configured to cover a shaft coupling that couples a main shaft of a prime mover and a main shaft of a driven apparatus as a rotatable apparatus configured to be driven by the prime mover is provided. This shaft coupling guard includes a guard main body formed so as to extend in a direction along an axis and having a tubular shape for circumferentially covering the shaft coupling. The guard main body includes a guard main body upper portion and a guard main body lower portion configured to be detachable from the guard main body upper portion. The shaft coupling guard further includes a leg portion formed integrally with the guard main body and configured to support the guard main body.

DESCRIPTION OF EMBODIMENTS

A: Embodiments

Figure 1:
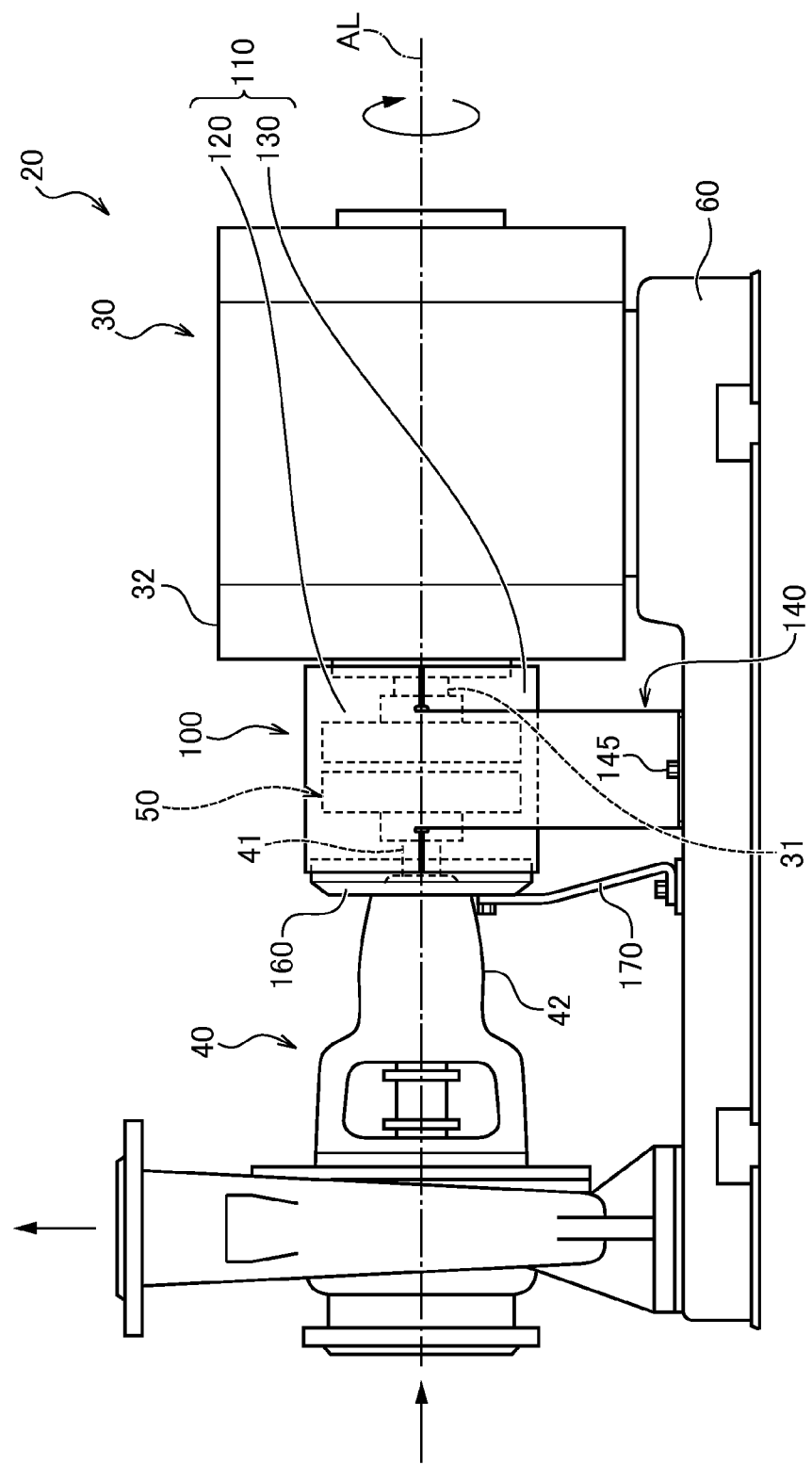
FIG. 1 schematically illustrates a configuration of a pump system according to an embodiment of the present invention.

According to a first embodiment of the present invention, a shaft coupling guard configured to cover a shaft coupling that couples a main shaft of a prime mover and a main shaft of a driven apparatus as a rotatable apparatus configured to be driven by the prime mover is provided. This shaft coupling guard includes a guard main body formed so as to extend in a direction along an axis and having a tubular shape for circumferentially covering the shaft coupling. The guard main body includes a guard main body upper portion and a guard main body lower portion configured to be detachable from the guard main body upper portion. The shaft coupling guard further includes a leg portion formed integrally with the guard main body and configured to support the guard main body.

According to this shaft coupling guard, the shaft coupling is circumferentially wholly covered with the guard main body, which can reduce an exposed range of a rotational mechanism around the shaft coupling compared to the conventional arch-shaped shaft coupling guard. Further, the guard main body includes vertically attachable and detachable members, facilitating a process for mounting the shaft coupling guard. Further, the guard main body is supported by the leg portion, thereby being prevented from being displaced vertically even upon reception of a vertically applied large force to maintain the shaft coupling in an appropriately protected state. In addition, the leg portion is formed integrally with the guard main body, thereby eliminating the necessity of attaching the leg portion to the guard main body at the time of mounting the shaft coupling guard to reduce a work load of a worker.

According to a second embodiment of the present invention, in the first embodiment, as the leg portion, leg portions are formed integrally with the guard main body upper portion at both ends of the guard main body upper portion opposite of the axis from each other. According to this embodiment, the guard main body upper portion can be mounted by being placed over the shaft coupling from above in such a manner that the shaft coupling is located between the leg portions at the both ends of the guard main body upper portion. Therefore, the shaft coupling guard can be easily mounted even after the shaft coupling is installed.

According to a third embodiment of the present invention, in the second embodiment, two or more upper flanges protruding outwardly are formed at the both ends of the guard main body upper portion so as to be spaced apart from each other or one another in the direction along the axis. The leg portions are formed between the two or more upper flanges so as to extend from the both ends of the guard main body upper portion in a direction intersecting the flanges. Lower flanges protruding outwardly are formed at positions corresponding to the upper flanges at both ends of the guard main body lower portion opposite of the axis from each other. The guard main body upper portion and the guard main body lower portion are attached to each other by joining the upper flanges and the lower flanges. According to this embodiment, the guard main body upper portion and the guard main body lower portion can be attached to each other without a gap generated therebetween. Further, the leg portion formed integrally with the guard main body upper portion is located between the two or more flanges at the guard main body lower portion, thereby facilitating positioning of the guard main body lower portion in the direction along the axis.

According to a fourth embodiment of the present invention, the shaft coupling guard according to any of the first to third embodiments further includes a guard side portion configured to cover an opening of the guard main body closer to the driven apparatus. The guard side portion has a through-hole to allow insertion of the main shaft of the driven apparatus therethrough. According to this embodiment, it is possible to reduce an exposed range of a rotational mechanism around the shaft coupling closer to the driven apparatus.

According to a fifth embodiment of the present invention, in the fourth embodiment, the guard side portion has a generally circular cross-sectional shape. At least a part of the guard side portion is located within the guard main body. The guard main body upper portion has a cross-sectional shape that generally complies with the cross-sectional shape of the guard side portion. The guard main body lower portion includes flat surfaces in parallel with a vertical direction at the both ends opposite of the axis from each other, and the guard main body lower portion has a cross-sectional shape that generally complies with the cross-sectional shape of the guard side portion inside the flat surfaces. A diameter of the generally circular cross-sectional shape of the guard side portion is approximately equal to a distance between the flat surfaces at the both ends of the guard main body lower portion. According to this embodiment, it is possible to reduce a gap between the guard main body and the guard side portion. Further, if the guard side portion is fixed to a container portion configured to contain a constituent member of the driven apparatus, the flat surfaces at the both ends of the guard main body lower portion are positionally retained by the guard side portion disposed inside the flat surfaces, thereby preventing the shaft coupling guard from rattling.

According to a sixth embodiment of the present invention, in the fifth embodiment, the guard main body upper portion is formed in such a manner that a height thereof in the vertical direction is longer than a half of a distance between the both ends of the guard main body upper portion, when the shaft coupling guard is mounted on a horizontal surface. The guard main body lower portion is formed in such a manner that a height thereof in the vertical direction is longer than a half of the distance between the flat surfaces at the both ends of the guard main body lower portion. According to this embodiment, a manufacturing tolerance can be easily absorbed, thereby facilitating assembling of the shaft coupling guard.

According to a seventh embodiment of the present invention, in any of the first to sixth embodiments, the guard main body lower portion has a through-hole extending through the guard main body lower portion in the vertical direction. According to this embodiment, if the shaft coupling is provided with a rubber, worn dust generated when the rubber is worn can be released out of the guard main body through the through-hole. Therefore, whether any abnormality occurs in the center of the shaft of the shaft coupling can be detected based on whether such dust is generated even without disassembling the shaft coupling guard. Desirably, the through-hole is sized to allow the dust to pass therethrough but prevent a human finger from entering therethrough.

According to an eighth embodiment of the present invention, in the fourth embodiment or any of the fifth to seventh embodiment at least including the fourth embodiment, the guard side portion is formed so as to extend in the direction along the axis, and at least a part of the guard side portion is located within the guard main body. An elongated hole is formed so as to extend in the direction along the axis at an end of the leg portion opposite from the guard main body. The elongated hole is configured to be used to fix the leg portion to a surface where the shaft coupling guard is mounted. According to this embodiment, a relative position between the guard side portion, and the guard main body and the leg portion can be displaced in the direction along the axis while maintaining the opening of the guard main body covered with the guard side portion. Therefore, it is possible to reduce the exposed range of the rotational mechanism around the shaft coupling closer to the prime mover by moving the guard main body in such a manner that the guard main body is located closer to or in abutment with the prime mover.

According to a ninth embodiment of the present invention, a rotatable apparatus system is provided. This rotatable apparatus system includes the prime mover, the driven apparatus, the shaft coupling, and the shaft coupling guard according to any of the first to eighth embodiments. This rotatable apparatus system can provide similar effects to the first to eight embodiments.

According to a tenth embodiment of the present invention, a rotatable apparatus system is provided. This rotatable apparatus system includes the prime mover, the driven apparatus, the shaft coupling, and the shaft coupling guard according to the fourth embodiment or any of the fifth to eighth embodiments at least including the fourth embodiment. The driven apparatus includes a container portion configured to contain a constituent member of the driven apparatus. The guard side portion is configured to be fixed to the container portion to cover an opening of the container portion. According to this embodiment, the guard side portion can be also used as a part of the container portion. Therefore, the number of parts can be reduced as a whole of the rotatable apparatus system. Further, as a result thereof, the rotatable apparatus system can be more easily installed.

According to an eleventh embodiment of the present invention, the rotatable apparatus system in the tenth embodiment further includes a support portion configured to support the constituent member of the driven apparatus. The guard side portion is configured to allow the support portion to be attached thereto. According to this embodiment, a component for attaching the support portion is formed at the guard side portion, which is relatively small in size. This facilitates processing during a manufacturing stage compared to forming this component at a member of the driven apparatus, which is relatively large in size. Hereinafter, embodiments of the invention will be described in detail.

Figure 2:
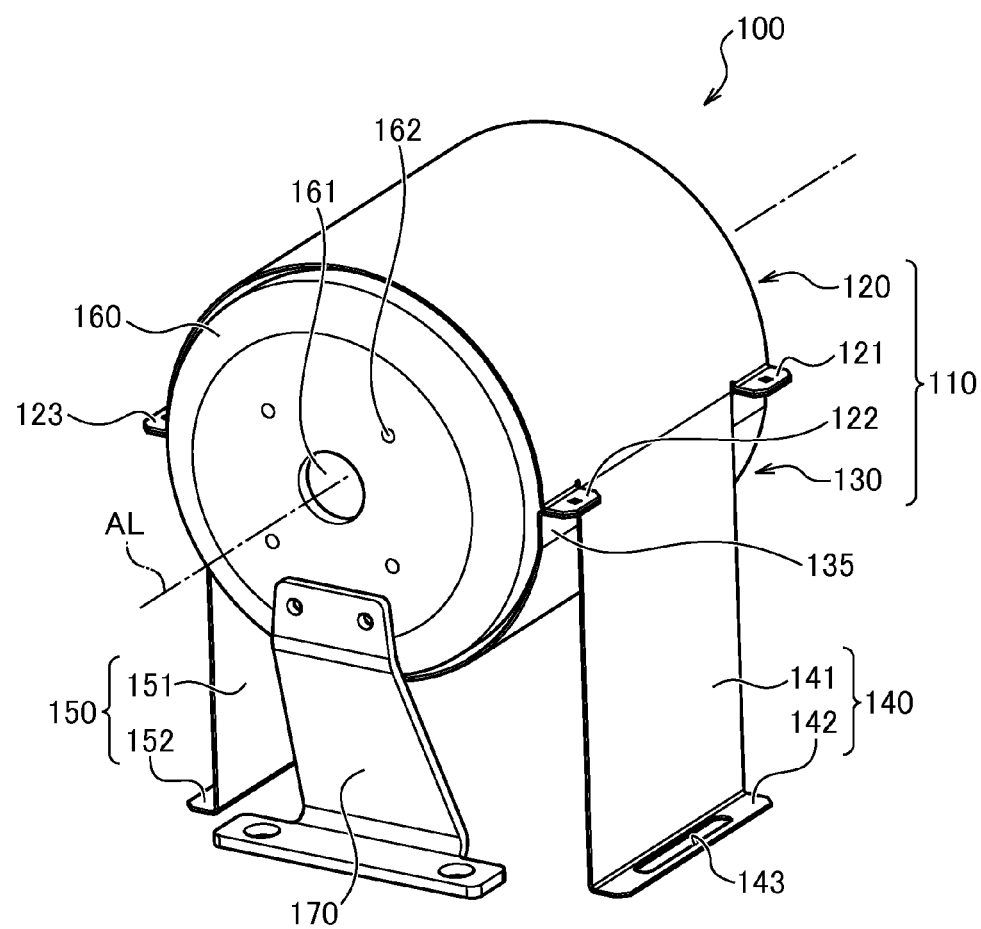
FIG. 2 is a perspective view schematically illustrating a shaft coupling guard.
Figure 3:
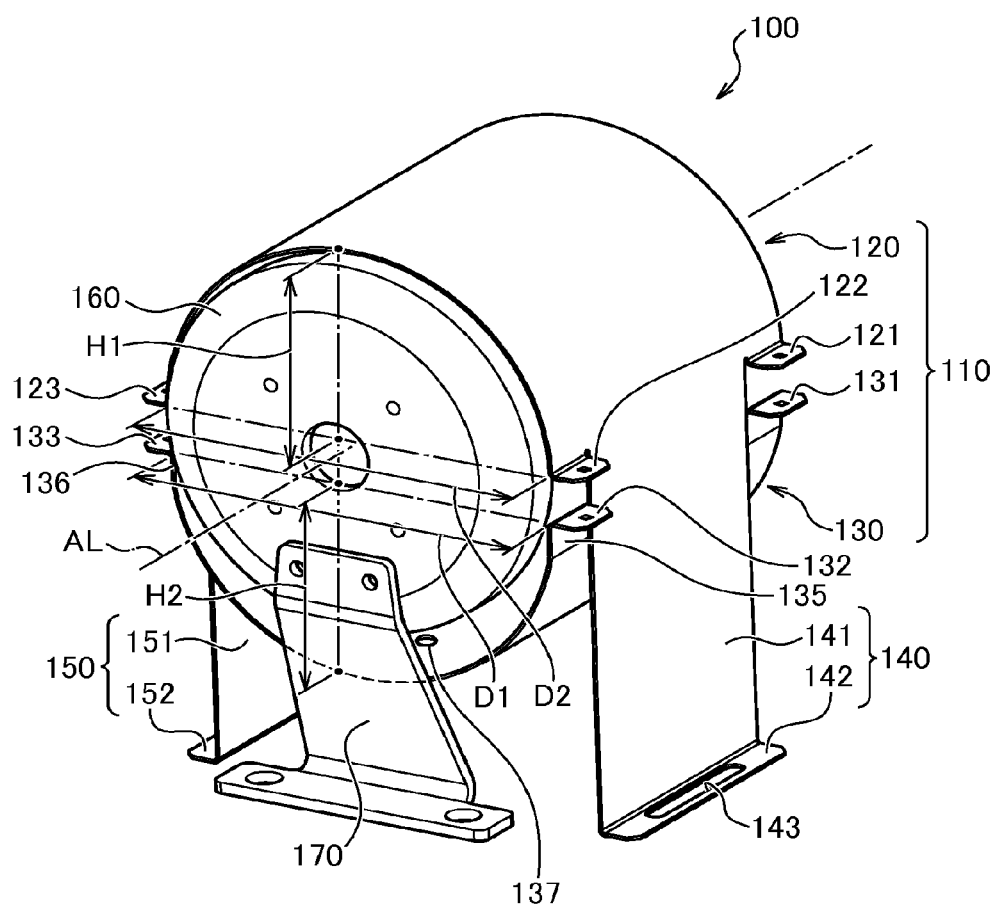
FIG. 3 is a perspective view illustrating how the shaft coupling guard is assembled.

FIG. 1 schematically illustrates a configuration of a pump system 20 including a shaft coupling guard 100 as an embodiment of the present invention. FIG. 2 schematically illustrates a configuration of the shaft coupling guard 100. FIG. 3 illustrates how the shaft coupling guard 100 is assembled. As illustrated in FIG. 1, the pump system 20 includes a motor 30 as a prime mover, a pump 40 as a driven apparatus, a shaft coupling 50, a base 60, and a shaft coupling guard 100. The motor 30 and the pump 40 are set up on the common base 60. A main shaft 31 of the motor 30 and a main shaft 41 of the pump 40 are coupled with each other on an axis AL via the shaft coupling 50 provided between the motor 30 and the pump 40. This shaft coupling 50 is covered with the shaft coupling guard 100.

As illustrated in FIG. 2, the shaft coupling guard 100 includes a guard main body 110, leg portions 140 and 150, and a guard side portion 160. The guard main body 110 includes a guard main body upper portion 120 and a guard main body lower portion 130. The guard main body upper portion 120 and the guard main body lower portion 130 are configured so as to be attachable to and detachable from each other. The guard main body upper portion 120 and the guard main body lower portion 130 have a cylindrical shape formed so as to extend along the axis AL when they are attached to each other. As illustrated in FIG. 1, the shaft coupling 50, the main shaft 31, and the main shaft 41 are contained in a space within the guard main body upper portion 120 and the guard main body lower portion 130. The shaft coupling 50 is circumferentially wholly covered with this guard main body 110.

As illustrated in FIG. 1, an opening of the guard main body 110 closer to the pump 40 (namely, of the pump 40 side) is covered with the guard side portion 160, as will be described in detail below. Further, the guard main body 110 is formed so as to extend to a position close to a casing 32 of the motor 30. As a result, an opening of the guard main body 110 closer to the motor 30 is covered with the casing 32. This configuration enables the shaft coupling guard 100 according to the present embodiment to be also configured so as to secure high safety. More specifically, this configuration can ensure that the shaft coupling guard 100 is closed with little gap enough to prevent a human finger from being inserted therein. Being closed with little gap enough to prevent a human finger from being inserted therein is defined, for example, in ISO13852:1996. The guard main body 110 and the casing 32 may be in abutment with each other. Further, the configuration of the shaft coupling guard 100 closer to the motor 30 can be also configured in a similar manner to the guard side portion 160 without utilizing the casing 32.

As illustrated in FIG. 2, upper flanges 121, 122, 123, and 124 (the upper flange 124 is not illustrated) are formed at both ends of the guard main body upper portion 120 opposite of the axis AL from each other. The upper flanges 121, 122, 123, and 124 protrude outwardly (in a direction opposite from the axis AL). The upper flanges 121 and 122 are formed so as to be spaced apart from each other in the direction along the axis AL. Similarly, the upper flanges 123 and 124 are formed so as to be spaced apart from each other in the direction along the axis AL at the opposite side from the upper flanges 121 and 122. Further, lower flanges 131, 132, 133, and 134 (the lower flange 134 is not illustrated) are formed at positions corresponding to the upper flanges 121, 122, 123, and 124 at both ends of the guard main body lower portion 130 opposite of the axis AL from each other. The upper flanges 121, 122, 123, and 124, and the lower flanges 131, 132, 133, and 134 are jointed to each other by fixing bolts, by which the guard main body upper portion 120 and the guard main body lower portion 130 are attached to each other without any gap generated therebetween.

The leg portions 140 and 150 support the guard main body 110. As illustrated in FIG. 2, the leg portion 140 includes a leg portion main body 141 and a fixation portion 142. The leg portion main body 141 has a flat plate shape formed so as to extend vertically. The fixation portion 142 is formed so as to extend from a lower end of the leg portion main body 141 horizontally outwardly (in the direction opposite from the axis AL). An elongated hole 143 is formed at the fixation portion 142 along the axis AL to fix the leg portion 140 to the base 60. FIG. 1 illustrates that the leg portion 140 is fixed to the base 60 by a bolt 145 inserted in the elongated hole 143.

As illustrated in FIG. 2, according to the present embodiment, the leg portion 140 is formed integrally with the guard main body upper portion 120. More specifically, the leg portion main body 141 is formed at one of the ends of the guard main body upper portion 120 opposite of the axis AL from each other, so as to extend from between the upper flanges 121 and 122 in a direction intersecting the upper flanges 121 and 122 (a direction perpendicular to the upper flanges 121 and 122 in this embodiment). As illustrated in FIG. 3, this configuration allows the guard main body upper portion 120 and the guard main body lower portion 130 to be attached each other while the leg portion main body 141 is inserted between the lower flanges 131 and 132, thereby facilitating positioning of the guard main body lower portion 130 in the direction along the axis AL. In other words, this configuration facilitates positioning of the guard main body lower portion 130 relative to the guard main body upper portion 120. Especially, according to the present embodiment, the leg portion 140 is formed in such a manner that a width of the leg portion main body 141 in the direction along the axis AL is approximately equal to a distance between the lower flanges 131 and 132. This further facilitates the positioning of the guard main body lower portion 130.

The leg portion 150 includes a leg portion main body 151, and a fixation portion 152 with an elongated hole 153 (not illustrated) formed thereon. The leg portion 150 is configured in a similar manner to the leg portion 140, except that the leg portion 150 is formed at the other of the ends of the guard main body upper portion 120 opposite of the axis AL from each other. Therefore, a detailed description of the leg portion 150 is omitted herein. The shaft coupling guard 100 according to the present embodiment can be mounted by placing the guard main body upper portion 120 over the shaft coupling 50 from above in such a manner that the shaft coupling 50 is located between the leg portions 140 and 150, because the leg portions 140 and 150 are integrally formed at the both ends of the guard main body upper portion 120. Therefore, even after the shaft coupling 50 is installed already, the shaft coupling guard 100 can be easily mounted.

As illustrated in FIGS. 1 and 2, the guard side portion 160 is disposed to cover the opening of the guard main body 110 closer to the pump 40. According to the present embodiment, the guard side portion 160 is generally circular in cross-section, and a through-hole 161 is formed at a center of the guard side portion 160 to allow insertion of the main shaft 41 therethrough. As illustrated in FIG. 2, a plurality of small holes 162 (four holes in this embodiment) is formed around the through-hole 161 of the guard side portion 160. The guard side portion 160 is fixed to a bearing frame 42 by utilizing these small holes 162 (refer to FIG. 1). The bearing frame 42 is used to contain a bearing, which is a constituent member of the pump 40. This guard side portion 160 can close an opening of the bearing frame 42 closer to the shaft coupling guard 100 by being fixed to the bearing frame 42. In other words, the guard side portion 160 also functions as a part of the bearing frame 42, in addition to functioning to close the opening of the guard main body 110. Therefore, the number of parts as the whole pump system 20 can be reduced. Further, as a result thereof, the process for installing the pump system 20 can be also simplified.

This guard side portion 160 is formed so as to extend in the direction along the axis AL as illustrated in FIG. 1, and is partially located inside the guard main body 110 as illustrated in FIG. 2. As illustrated in FIG. 2, the cross-section of the guard main body upper portion 120 has a generally arcuate shape that generally conforms with the circular cross-sectional shape of the guard side portion 160. The term "generally conform" herein is defined to mean that a shape of a member matches and completely conforms with a shape of another member, or conforms with the shape of another member to a degree that allows generation of a gap small enough to prevent a human finger from entering therein. As illustrated in FIG. 3, the guard main body lower portion 130 includes flat surfaces 135 and 136 opposite of the axis AL from each other, at the both sides of the guard main body lower portion 130 opposite of the axis AL from each other. The flat surfaces 135 and 136 extend in parallel with the vertical direction. Inside the flat surfaces 135 and 136, the guard main body lower portion 130 has a generally arcuate cross-sectional shape that generally conforms with the generally circular cross-sectional shape of the guard side portion 160. In other words, the cross-sectional shape of this guard main body lower portion 130 is a shape obtained by bending both ends of a generally semi-circular shape in parallel with the vertical direction.

The flat surfaces 135 and 136 are formed in such a manner that a distance D1 between the flat surfaces 135 and 136 is approximately equal to the diameter of the guard side portion 160. The term "approximately equal" herein is defined to mean that, for example, these dimensions are equal to each other to such a degree that the flat surfaces 135 and 136 are in contact with a part of the guard side portion 160 when the shaft coupling guard 100 is attached to the guard side portion 160. According to this configuration, the horizontal positions of the flat surfaces 135 and 136 of the guard main body lower portion 130 are retained by the guard side portion 160 fixedly disposed inside the flat surfaces 135 and 136, even without fixing the guard side portion 160 fixed to the bearing frame 42 to the guard main body 110. As a result, even when a vibration is transmitted from the pump 40 to the guard main body lower portion 130 via the guard side portion 160, the guard main body lower portion 130, and thus the shaft coupling guard 100 can be prevented from rattling. Especially, compared to the guard main body lower portion 130 that does not include the flat surfaces 135 and 136, i.e., the guard main body lower portion 130 that has a generally arcuate cross-section as a whole, a contact area increases between the guard side portion 160 and the guard main body lower portion 130, or a gap reduces between the guard side portion 160 and the guard main body lower portion 130, thereby providing an effective configuration.

Further, as illustrated in FIG. 3, the guard main body upper portion 120 is formed in such a manner that a height H1 of the guard main body upper portion 120 in the vertical direction is longer than a half of a distance D2 between the both ends of the guard main body upper portion 120 opposite of the axis AL from each other. Similarly, the guard main body lower portion 130 is formed in such a manner that a height H2 of the guard main body lower portion 130 in the vertical direction is longer than a half of the distance D1 between the flat surfaces 135 and 136 of the guard main body lower portion 130. According to this configuration, as illustrated in FIG. 2, almost no gap is generated between the guard main body upper portion 120 and the guard main body lower portion 130, and the guard side portion 160 at a position around the axis AL in the vertical direction, while a slight gap is generated between the guard main body upper portion 120 and the guard main body lower portion 130, and the guard side portion 160 at a position somewhat spaced apart from the axis AL in the vertical direction. This arrangement allows the generated gap to easily absorb manufacturing tolerances of the guard main body upper portion 120 and the guard main body lower portion 130, thereby facilitating assembling of the shaft coupling guard 100. For example, even if the guard main body upper portion 120 or the guard main body lower portion 130 is manufactured into an arcuate shape having a curvature center offset from the axis, this deviation can be easily absorbed.

As illustrated in FIG. 1, the bearing frame 42, to which the guard side portion 160 is attached, is supported by a support portion 170. More specifically, one end side of the support portion 170 is fixed to the guard side portion 160, fixed to the bearing frame 42, by a bolt, and an opposite end of the support portion 170 is fixed to the base 60 by a bolt. According to this configuration, supporting the bearing frame 42 can be realized by just forming a bolt hole at the guard side portion 160, which is a relatively small part. This can facilitate processing of parts during a manufacturing stage, compared to providing a means (for example, a bolt hole, or a convex portion for fixing the support portion 170) for attaching the support portion 170 to the bearing frame 42, which is a relatively large part.

Figure 4A:
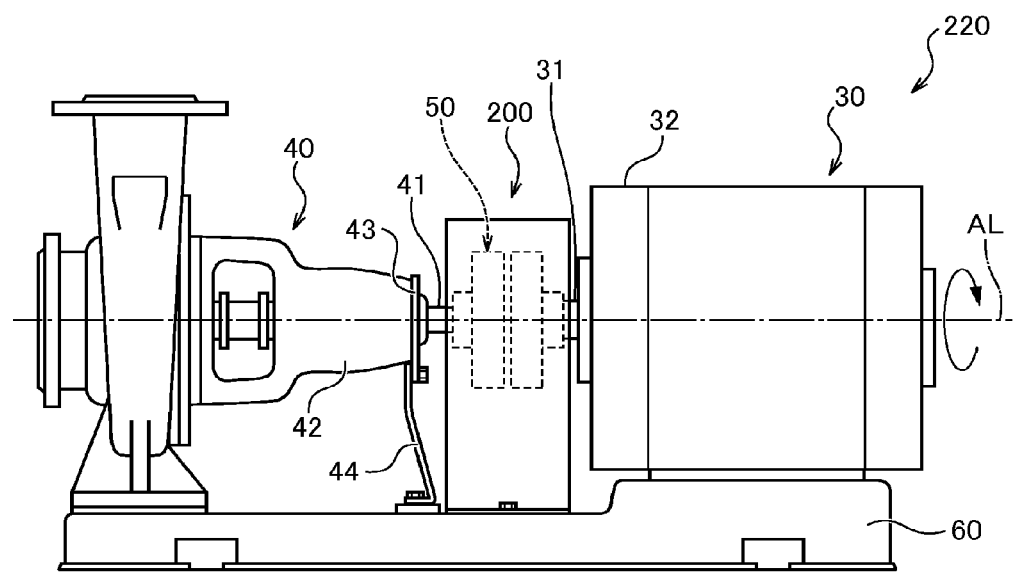
FIG. 4(A) and FIG. 4(B) schematically illustrate a configuration of a pump system including a shaft coupling guard as a comparative example.
Figure 4B:
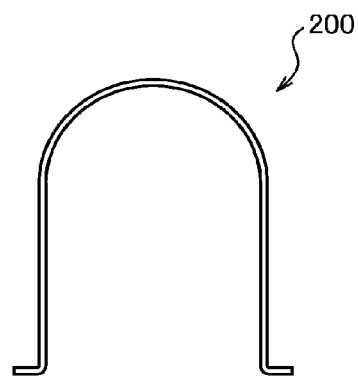

A pump system 220 will be described as a comparative example to further clarify the effects of the above-described shaft coupling guard 100. FIG. 4(A) and FIG. 4(B) schematically illustrate a configuration of the pump system 220. In FIGS. 4(A) and 4(B), similar components to the pump system 20 are identified by the same reference numerals as FIG. 1. In the following description, the pump system 220 will be described only focusing on differences from the pump system 20. As illustrated in FIG. 4(B), a shaft coupling guard 200 has an arch-like (tunnel-like) shape, and is opened at the bottom side thereof. As illustrated in FIG. 4(A), this shaft coupling guard 200 can be easily mounted onto the base 60 from above in such a manner that the shaft coupling 50 is contained within the shaft coupling guard 200.

In this pump system 220, the shaft coupling guard 200 is widely opened at the both sides thereof in the direction along the axis AL. The opening of the shaft coupling guard 200 at the end thereof close to the motor 30 can be covered by utilizing the casing 32, but the lower side thereof is still widely opened compared to the upper side thereof. Further, the opening of the shaft coupling guard 200 at the end thereof close to the pump 40 is widely opened compared to the opening close to the motor 30. A bearing cover 43 is attached to an end of the bearing frame 42 closer to the motor 30, thereby closing an opening of the bearing frame 42 at this end. Further, a support portion 44 is attached to the bearing cover 43, and the bearing frame 42 is supported by the support portion 44.

On the other hand, the above-described shaft coupling guard 100 as the embodiment of the present invention allows the shaft coupling 50 to be circumferentially wholly covered with the guard main body 110, thereby reducing an exposed range of a rotational mechanism around the shaft coupling 50 compared to the shaft coupling guard 200 described as a comparative example. Moreover, the openings of the guard main body 110 at the both sides are also covered with the guard side portion 160 and the casing 32, thereby securing high safety. Further, the guard side portion 160 and the support portion 170 are provided instead of the bearing cover 43 and the support portion 44 of the pump system 220, thereby preventing the number of parts from largely increasing. Therefore, the pump system can be installed without imposing a heavy load on a worker.

Further, the guard side portion 160 is formed so as to extend in the direction along the axis AL, and the elongated holes 143 and 153 are formed at the leg portions 140 and 150, respectively. Therefore, a relative position between the guard side portion 160, and the guard main body 110 and the leg portions 140 and 150 can be displaced in the direction along the axis AL, while keeping the opening of the guard main body 110 covered with the guard side portion 160. Accordingly, the leg portions 140 and 150 can be fixed to the base 60 after the guard main body 110 is displaced so as to be located closer or in abutment with the motor 30. Especially, the exposed range of the rotational mechanism around the shaft coupling 50 closer to the motor 30 can be reduced no matter how far the pump 40 and the motor 30 are spaced apart from each other, whereby the present embodiment can be flexibly and widely used for various types of systems.

Further, the shaft coupling guard 100 is configured in such a manner that the guard main body upper portion 120 and the guard main body lower portion 130 are attachable to and detachable from each other, and therefore can be easily assembled compared to a configuration (not illustrated) that requires to pass the main shaft through a tubular shaft coupling guard to cover the shaft coupling and the vicinity thereof with this shaft coupling guard during assembling of the pump system. Further, the guard main body 110 is supported by the leg portions 140 and 150 from directly below the guard main body 110, and thereby is prevented from being easily displaced vertically even when the guard main body 110 receives a large force vertically applied from a vibration or the like. Therefore, the shaft coupling guard 100 can maintain the shaft coupling 50 in an appropriately protected state. Further, the leg portions 140 and 150 are formed integrally with the guard main body upper portion 120, eliminating the necessity of even a process for attaching the leg portions 140 and 150 to the guard main body 110.

B. Modification

B-1. First Modification

A through-hole 137 may be formed through the guard main body lower portion 130 so as to vertically extend through the guard main body lower portion 130. As this through-hole, the guard main body lower portion 130 may have a single hole or a plurality of holes. Desirably, the through-hole is sized to secure high safety. According to this configuration, when the rubber of the shaft coupling 50 is worn to generate worn dust, such dust can be released out of the guard main body 110 through the through-hole. Therefore, whether an abnormality occurs in the shaft center of the shaft coupling 50 can be detected by observing whether such dust is generated even without disassembling the shaft coupling guard 100.

B-2. Second Modification

The shape of the shaft coupling guard 100 may be not only a cylindrical shape but also any tubular shape formed so as to extend in the direction along the axis AL. For example, the guard main body 110 may have a rectangular shape in cross-section. Further, the positions, the shapes, and the number of the leg portions 140 and 150 may be any positions, any shapes, and any number. For example, the leg portion main bodies 141 and 151 of the leg portions 140 and 150 may be formed so as to extend obliquely relative to the vertical direction so that the distance therebetween increases toward the bottoms thereof (toward the base 60). This arrangement facilitates the observation of whether dust is generated in the first modification. Alternatively, the leg portion main bodies 141 and 151 may be formed so as to extend from the both ends of the guard main body upper portion 120 horizontally outwardly (in the direction opposite from the axis AL), and then be bent to extend vertically downwardly. Further alternatively, the leg portions 140 and 150 may include pluralities of leg portions spaced apart in the direction along the axis AL, respectively. In this case, three or more upper flanges, and three or more lower flanges may be provided. Further, the leg portions 140 and 150 may be formed integrally with the guard main body lower portion 130. For example, the leg portions 140 and 150 may be formed so as to extend from the both ends of the guard main body lower portion 130 vertically downwardly. Alternatively, the shaft coupling guard 100 may include a single leg portion extending from the bottom of the guard main body lower portion 130, instead of the leg portions 140 and 150.

B-3. Third Modification

The shaft coupling guard 100 can be used for any of various kinds of rotatable apparatus systems including a prime mover and a driven apparatus as a rotatable apparatus. Examples of this driven apparatus include a liquid agitator, a centrifugal fan/ventilator, a conveyer for a lightweight object, a power generator, a worm gear reducer, a conveyer, a hoist, an elevator, a line shaft, a hole mill, a reciprocating compressor, a hammer mill, a crasher, and a marine propeller. Further, examples of the prime mover include a turbine and an engine.

Having described embodiments of the present invention based on several examples, the embodiments of the invention described above are intended to facilitate the understanding of the present invention, and are not intended to limit the present invention in any manner. The present invention can be modified and improved without departing from the spirit thereof, and equivalents thereof are included in the present invention as a matter of course. Further, the features described in the claims and the specification can be combined or omitted within a range that can achieve at least a part of the above-described objects or a range that can provide at least a part of the effects.

What is claimed is:

1. A shaft coupling guard configured to cover a shaft coupling that couples a main shaft of a prime mover and a main shaft of a driven apparatus as a rotatable apparatus configured to be driven by the prime mover, the shaft coupling guard comprising:
a guard main body formed so as to extend in a direction along an axis and having a tubular shape for circumferentially covering the shaft coupling, the guard main body including a guard main body upper portion, and a guard main body lower portion configured to be attachable to and detachable from the guard main body upper portion; and
leg portions formed integrally with the guard main body and configured to support the guard main body,
wherein the leg portions are formed integrally with the guard main body upper portion at both ends of the guard main body upper portion opposite of the axis from each other.

2. The shaft coupling guard according to claim 1, further comprising a guard side portion configured to cover an opening of the guard main body closer to the driven apparatus, the guard side portion having a through-hole to allow insertion of the main shaft of the driven apparatus therethrough.

3. The shaft coupling guard according to claim 2, wherein the guard side portion has a generally circular cross-sectional shape,
wherein at least a part of the guard side portion is located within the guard main body,
wherein the guard main body upper portion has a cross-sectional shape that generally complies with the cross-sectional shape of the guard side portion,
wherein the guard main body lower portion includes flat surfaces in parallel with a vertical direction at the both ends opposite of the axis from each other, and the guard main body lower portion has a cross-sectional shape that generally complies with the cross-sectional shape of the guard side portion inside the flat surfaces, and
wherein a diameter of the generally circular cross-sectional shape of the guard side portion is approximately equal to a distance between the flat surfaces at the both ends of the guard main body lower portion.

4. The shaft coupling guard according to claim 3, wherein the guard main body upper portion is formed in such a manner that a height thereof in the vertical direction is longer than a half of a distance between the both ends of the guard main body upper portion, and wherein the guard main body lower portion is formed in such a manner that a height thereof in the vertical direction is longer than a half of the distance between the flat surfaces at the both ends of the guard main body lower portion.

5. The shaft coupling guard according to claim 2, wherein the guard side portion is formed so as to extend in the direction along the axis, and at least a part of the guard side portion is located within the guard main body, and
wherein an elongated hole is formed so as to extend in the direction along the axis at an end of the leg portion opposite from the guard main body, the elongated hole being configured to be used to fix the leg portion to a surface where the shaft coupling guard is mounted.

6. A rotatable apparatus system comprising:
the prime mover;
the driven apparatus;
the shaft coupling; and
the shaft coupling guard according to claim 2,
wherein the driven apparatus includes a container portion configured to contain a constituent member of the driven apparatus, and
wherein the guard side portion is configured to be fixed to the container portion to cover an opening of the container portion.

7. The rotatable apparatus system according to claim 6, further comprising a support portion configured to support the constituent member of the driven apparatus,
wherein the guard side portion is configured to allow the support portion to be attached thereto.

8. The shaft coupling guard according to claim 1, wherein the guard main body lower portion has a through-hole extending through the guard main body lower portion in the vertical direction.

9. A rotatable apparatus system comprising:
the prime mover;
the driven apparatus;
the shaft coupling; and
the shaft coupling guard according to claim 1.

10. The shaft coupling guard according to claim 1, wherein the leg portions extends in parallel with a vertical direction, and
wherein the guard main body lower portion includes flat surfaces in parallel with the vertical direction at the both ends opposite of the axis from each other.

11. The shaft coupling guard according to claim 1, wherein the guard main body has a generally circular cross-sectional shape, and
wherein the guard main body lower portion is formed in such a manner that a height thereof in a vertical direction is longer than a half of the distance between both ends of the guard main body lower portion opposite of the axis from each other.

12. A shaft coupling guard configured to cover a shaft coupling that couples a main shaft of a prime mover and a main shaft of a driven apparatus as a rotatable apparatus configured to be driven by the prime mover, the shaft coupling guard comprising:
a guard main body formed so as to extend in a direction along an axis and having a tubular shape for circumferentially covering the shaft coupling, the guard main body including a guard main body upper portion, and a guard main body lower portion configured to be attachable to and detachable from the guard main body upper portion; and
leg portions formed integrally with the guard main body and configured to support the guard main body,
wherein the leg portions are formed integrally with the guard main body upper portion at both ends of the guard main body upper portion opposite of the axis from each other,
wherein two or more upper flanges protruding outwardly are formed at the both ends of the guard main body upper portion so as to be spaced apart from each other or one another in the direction along the axis,
wherein the leg portions are formed between the two or more upper flanges so as to extend from the both ends of the guard main body upper portion in a direction intersecting the flanges,
wherein lower flanges protruding outwardly are formed at positions corresponding to the upper flanges at both ends of the guard main body lower portion opposite of the axis from each other, and
wherein the guard main body upper portion and the guard main body lower portion are attached to each other by joining the upper flanges and the lower flanges.

* * * * *